United States Patent
Rutherford

(10) Patent No.: US 7,040,152 B2
(45) Date of Patent: May 9, 2006

(54) PNEUMATIC TIRE AIR PRESSURE GAUGE ASSEMBLY

(75) Inventor: Robert Rutherford, Reno, NV (US)

(73) Assignee: Creative Auto Resources, Inc., Folsom, CA (US)

( * ) Notice: Subject to any disclaimer, the term of this patent is extended or adjusted under 35 U.S.C. 154(b) by 162 days.

(21) Appl. No.: 10/201,024

(22) Filed: Jul. 22, 2002

(65) Prior Publication Data

US 2004/0011123 A1 Jan. 22, 2004

(51) Int. Cl.
*G01M 17/02* (2006.01)

(52) U.S. Cl. ....................................... 73/146

(58) Field of Classification Search ....... 73/146–146.8, 73/700–756
See application file for complete search history.

(56) References Cited

U.S. PATENT DOCUMENTS

| 3,789,867 A | | 2/1974 | Yabor | |
|---|---|---|---|---|
| 3,873,965 A | | 3/1975 | Garcia | |
| 3,990,309 A | * | 11/1976 | Beckwith et al. | 73/708 |
| 4,051,803 A | | 10/1977 | Arnone | |
| 4,270,568 A | * | 6/1981 | Gray | 137/498 |
| 4,619,137 A | | 10/1986 | Bott | |
| 4,763,516 A | | 8/1988 | Greenspan | |
| 4,773,270 A | * | 9/1988 | Ogasawara et al. | 73/732 |
| 4,924,697 A | * | 5/1990 | Hunt et al. | 73/146.8 |
| 4,953,395 A | | 9/1990 | Jard | |
| 4,970,491 A | | 11/1990 | Saint | |
| 5,357,242 A | * | 10/1994 | Morgano et al. | 340/626 |
| 5,365,967 A | | 11/1994 | Moore | |
| 5,377,539 A | | 1/1995 | LaSalle | |
| 5,965,822 A | * | 10/1999 | Wu | 73/744 |
| 6,085,595 A | * | 7/2000 | Ferguson | 73/730 |
| 6,119,525 A | * | 9/2000 | Hamma | 73/739 |

OTHER PUBLICATIONS

Spiragage Plus product description.

* cited by examiner

*Primary Examiner*—Edward Lefkowitz
*Assistant Examiner*—Jermaine Jenkins
(74) *Attorney, Agent, or Firm*—Heisler & Associates

(57) ABSTRACT

A compact air pressure gauge assembly mountable to the valve stem of a inflatable tire or mountable through the rim of a wheel for continuous monitoring of the tire inflation pressure. The air pressure gauge assembly has a compact design to extend the valve stem or wheel rim relatively little to avoid curb contact and interference with the wheel balance. By positioning the air intake in a right angle with the opening for receiving a standard valve stem or by positioning the air intake straight across the opening for receiving the valve stem while the dial face is positioned in an right angle, the air intake is separated from the airtight chamber housing the sensing element. A diaphragm having a simple mechanical design is provided as sensing element. The diaphragm includes a membrane being connected with a pressure indicator that moves up and down according to the tire pressure. The compact air pressure gauge assembly is designed to withstand substantial impact and to seal the tire in case the gauge body is accidentally broken off or fractured. Furthermore, the compact air pressure gauge assembly is relatively inexpensive, reliable, and of little or no maintenance.

40 Claims, 3 Drawing Sheets

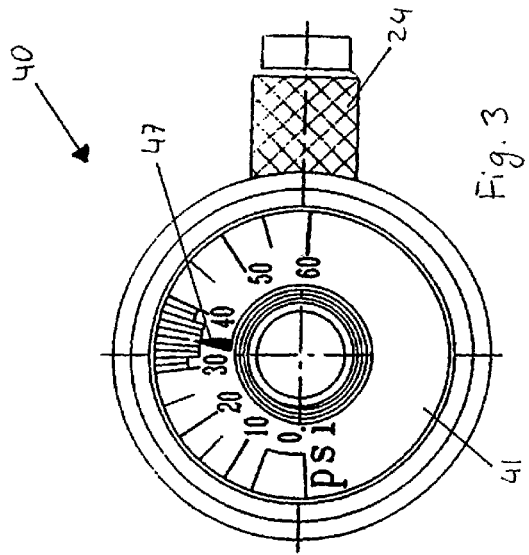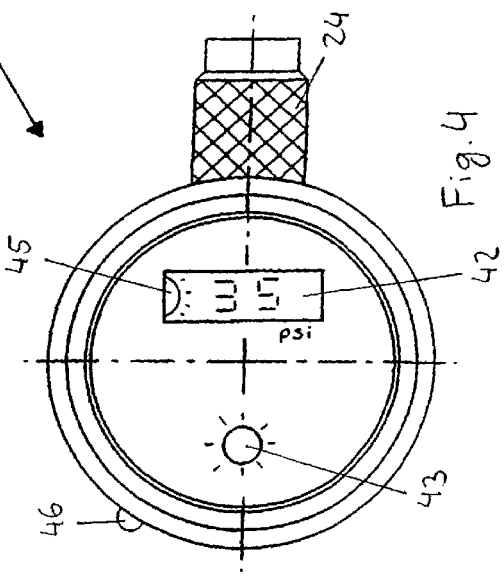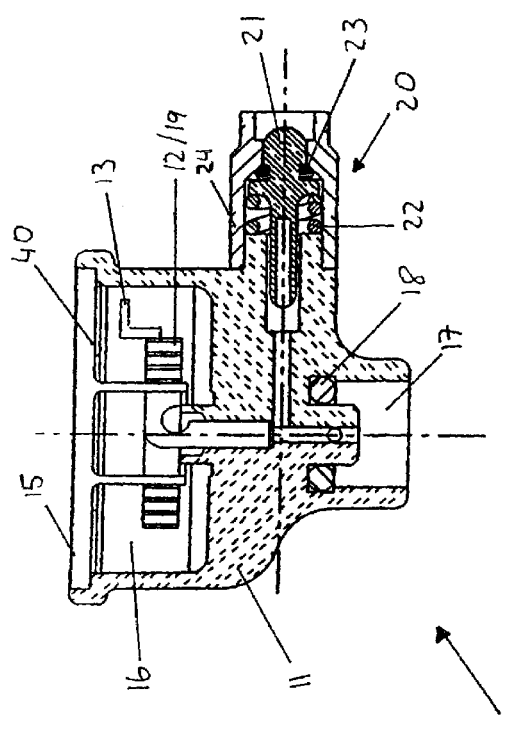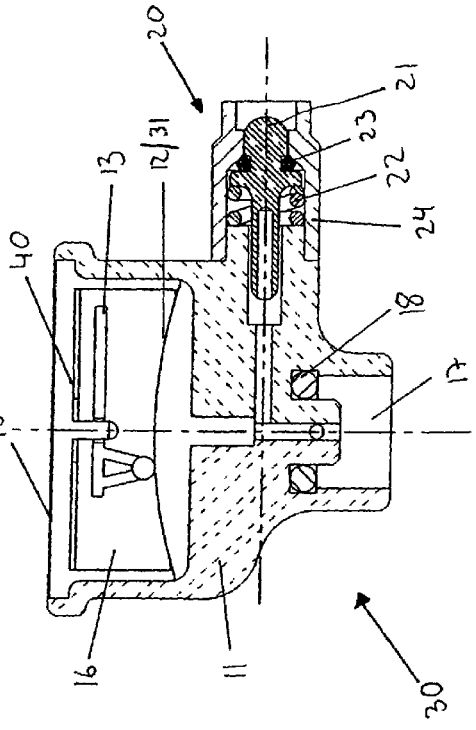

PNEUMATIC TIRE AIR PRESSURE GAUGE ASSEMBLY

BACKGROUND OF THE INVENTION

1. Field of the Invention

This invention relates generally to air pressure gauges for pneumatic tires and, more specifically, to a compact air pressure gauge assembly mountable to a valve stem of a tire or mountable through the rim of a wheel for continuous monitoring of the tire inflation pressure.

2. Description of the Prior Art

Proper tire inflation is important for fuel economy of a vehicle and prolongs the life of a tire. By maintaining proper tire inflation, optimum performance of a vehicle can be reached while keeping the operating costs relatively low and the safety relatively high. Under inflation of a tire can cause excessive wear of the tire, tire failure, loss of fuel economy, excessive engine drag, increased emissions, and depletion of fossil fuels.

In general, the air pressure of a tire is checked by removing a cap from a valve stem, applying a pressure gauge to the valve stem to get a pressure reading, and replacing the cap onto the valve stem. While inflating the tire to reach a desired air pressure, the pressure gauge needs to be applied to the valve stem several times alternating between inflating the tire with an air pump or the like and checking the air pressure by applying the pressure gauge to the valve stem. This procedure is inconvenient and time consuming.

In order to simplify this process air pressure gauges mounted directly to a tire valve stem have been developed, for example U.S. Pat. No. 4,924,697 issued to Hunt et al. and U.S. Pat. No. 5,377,539 issued to LaSalle. These prior art air pressure gauges monitor and indicate the tire inflation pressure continuously. However, using valve stem extenders for mounting these prior art gauges cause them to extend relatively far out of the tire valve stem. This might cause a problem since devices that extend the valve stem may influence the balance of the wheel.

While LaSalle illustrates an air pressure gauge that does not interfere with the tire inflation through the valve stem and also monitors the air pressure while inflating the tire, Hunt et al. provides an air pressure gauge that still needs to be removed for inflating of the tire. Still both prior art air pressure gauges are connected to the tire valve stem and are driven by the air coming through the valve stem. This can cause a problem while replacing the tire and/or the valve stem.

Further, the air pressure gauge illustrated by LaSalle shows the air intake leading through the chamber housing a pressure indicator or sensing element, which can interfere with the function of the indicator or sensing element.

Also, if a prior art pressure gauge is accidentally broken off or fractured, air may leak causing hazardous deflation of the tire. Moreover, depending on the tire positions, prior art air pressure gauges may be hard to read.

Therefore a need existed to provide an air pressure gauge assembly mountable to a valve stem of a tire or mountable through the rim of a wheel and having a compact design.

A further need existed to provide an air pressure gauge assembly that barely extends the valve stem or wheel rim in order to avoid curb contact and interference with the wheel balance.

A still further need existed to provide an air pressure gauge assembly that allows for the continuous monitoring of the tire pressure, is easy to read, indicates a warning for lower than normal air pressure, and therefore eliminates the use of an external handheld air pressure gauge.

A still further need existed to provide an air pressure gauge assembly that does not interfere with the function of the tire valve stem.

A still further need existed to provide an air pressure gauge assembly that has the air intake separate from the chamber housing a pressure indicator or sensing element.

SUMMARY OF THE INVENTION

An object of the present invention is to provide a compact air pressure gauge assembly for continuous monitoring of the inflation pressure of a tire that is mountable to a valve stem of a tire or mountable through the rim of a wheel.

It is a further object of the present invention to provide an air pressure gauge assembly that extends the valve stem or wheel rim relatively little in order to avoid curb contact and interference with the wheel balance.

It is a still further object of the present invention to provide an air pressure gauge assembly that is easy to read, indicates a warning for lower than normal air pressure, and therefore eliminates the use of an external handheld air pressure gauge.

It is a still further object of the present invention to provide an air pressure gauge assembly that does not interfere with the function of the tire valve stem.

It is a still further object of the present invention to provide an air pressure gauge assembly that has the air intake separate from the chamber housing a pressure indicator or sensing element.

It is a still further object of the present invention to provide an air pressure gauge assembly that has a sensing element of relatively simple mechanical design.

It is a still further object of the present invention to provide an air pressure gauge assembly that is able to seal the tire if the gauge body is accidentally broken off or fractured.

It is a still further object of the present invention to provide an air pressure gauge assembly that is sturdy enough to withstand the centrifugal forces of the rotating tire.

It is a still further object of the present invention to provide an air pressure gauge assembly that is relatively inexpensive, reliable, and of little or no maintenance.

BRIEF DESCRIPTION OF THE PREFERRED EMBODIMENTS

In accordance with one embodiment of the present invention, a compact air pressure gauge assembly mountable to a valve stem of a inflatable tire or through the wheel rim is disclosed comprising, in combination: a gauge body having an opening for receiving a standard valve stem, a sensing element being disposed in an airtight chamber inside the gauge body, a pressure indicator being connected with the sensing element, an air exhaust check valve, a dial face, and a lens cover.

In accordance with another embodiment of the present invention, a compact air pressure gauge assembly is disclosed, wherein the air exhaust check valve is positioned in a right angle with the opening for receiving a valve stem.

In accordance with still another embodiment of the present invention, a compact air pressure gauge assembly is disclosed, wherein the air exhaust check valve is positioned straight across the opening for receiving a valve stem while the dial face is positioned in a right angle.

In accordance with still another embodiment of the present invention, an air pressure gauge assembly is disclosed, wherein the sensing element comprises a diaphragm. The diaphragm includes a membrane being in a geared or non-geared connection with the pressure indicator.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 1 is a cross sectional view of a first air pressure gauge assembly having a right-angled air intake according to the present invention.

FIG. 2 is a cross sectional view of a second air pressure gauge assembly having a right-angled air intake and a according to the present invention.

FIG. 3 is a top view of an analog dial face of the air pressure gauge assembly of FIGS. 1 and 2 according to the present invention.

FIG. 4 is a top view of a digital dial face of the air pressure gauge assembly of FIGS. 1 and 2 according to the present invention.

DETAILED DESCRIPTION OF THE PREFERRED EMBODIMENTS

Figure 5:
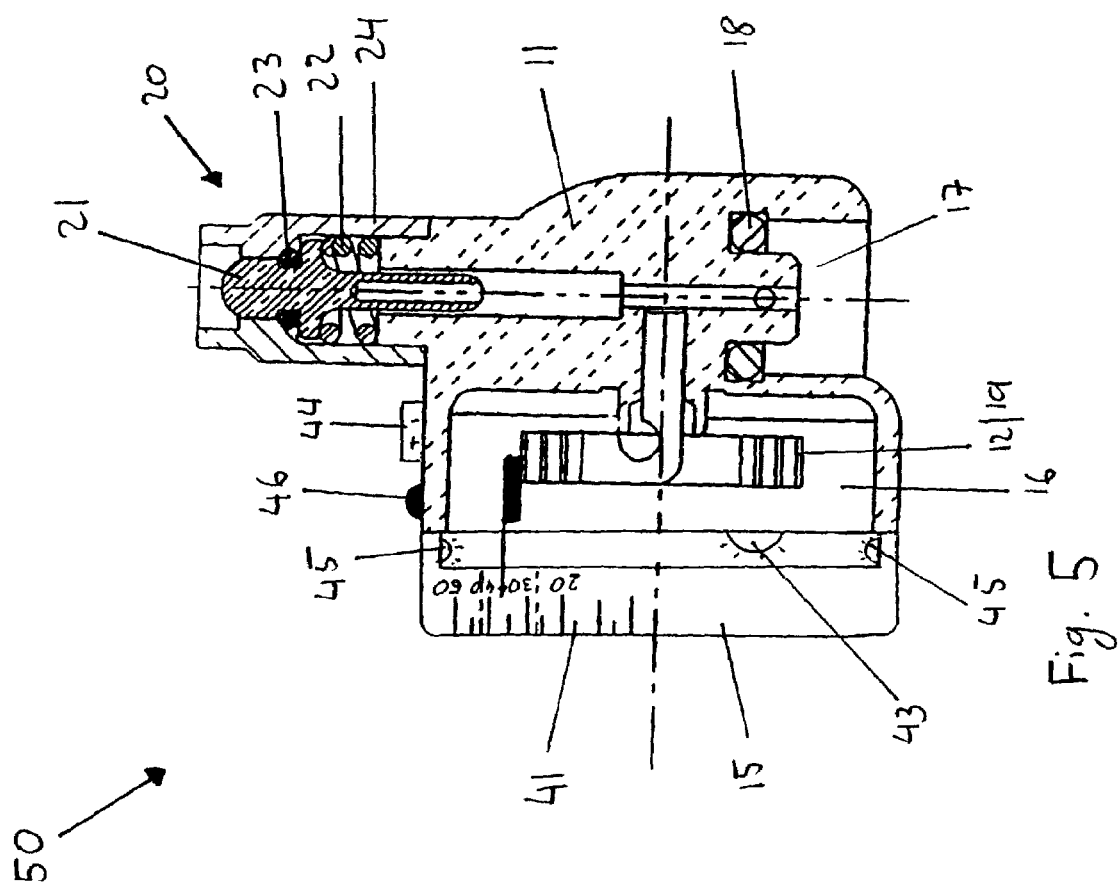
FIG. 5 is a cross sectional view of an air pressure gauge assembly having a straight air intake according to the present invention.

Referring to FIG. 1 a cross sectional view of a first air pressure gauge assembly 10 having a right-angled air intake according to the present invention is shown. The air pressure gauge assembly 10 generally comprises a gauge body 11, a sensing element 12, a pressure indicator 13, a dial face 40, a lens cover 15, and an air exhaust check valve 20. An opening 17 is provided for receiving a typical valve stem of an inflatable tire. The air pressure gauge assembly 10 can be mounted, preferably screwed on, to the typical valve stem and can be locked in this position using e.g. a locking screw. The connection is sealed with a washer 18, generally an o-ring.

In one embodiment the sensing element 12 is a Bourdon tube 19, as shown in FIG. 1. The Bourdon tube 19 is configured as a spiral coil. The Bourdon tube 19 is disposed in an airtight chamber 16 that can be non-liquid or liquid filled. By mounting the gauge body 11 to the valve stem, the valve core is depressed and therefore, air can flow from inside the tire into the Bourdon tube 19. Should the gauge body 11 accidentally be broken off or fractured, the depressed valve core will be released to seal the valve stem and to maintain the air pressure inside the tire. The Bourdon tube 19 will coil, either clockwise or counter-clockwise, more tightly or uncoil more loosely in response to the air pressure condition within the core of the tube and therefore move the pressure indicator 13 accordingly. The bourdon tube can also be a helix coil, or a c-tube, similar to "Power Flex™ Movement" manufactured by ASHCROFT®.

In another embodiment, the sensing element 12 of air pressure gauge assembly 30 is a diaphragm 31, as shown in FIG. 2. The diaphragm 31 comprises a membrane that is disposed over an opening in the gauge body 11 in an airtight chamber 16. By mounting the gauge body 11 to the valve stem, the valve core is depressed and therefore, air can flow from inside the tire towards the membrane of the diaphragm 31. The membrane of the diaphragm 31 will move up or down according to the tire pressure. The pressure indicator 13 is in a geared or non-geared connection with the membrane of the diaphragm 31 opposite of the incoming airflow and will be moved according to the air pressure.

In one embodiment, the pressure indicator 13 comprises a pointer 47 moving along an analog display 41 of the dial face 40, as shown in FIG. 3. The analog display 41 further comprises indicia and a dial scale thereon for indicating the air pressure detected by the sensing element 12. In another embodiment, the dial face 40 is a digital display 42, generally a LCD/LED display, as shown in FIG. 4.

A lens cover 15 covers the dial face 40 and is in a sealed connection with the gauge body 11 enclosing the airtight chamber 16 as shown in FIGS. 1 and 2. In one embodiment, the lens cover 15 is a non-magnifying lens generally glued on top of the gauge body 11, as shown in FIGS. 1 and 2. In another embodiment, the lens cover 15 is a magnifying lens, as shown in FIG. 5.

Still referring to FIGS. 1 and 2, the air exhaust check valve 20 comprises a plunger 21, an air exhaust compressing spring 22, a check valve washer 23, generally an o-ring, and an air intake manifold cover 24. The air intake cover 24 is threaded on the outside to accept a standard valve stem cap.

The air exhaust check valve 20 allows tire inflation or deflation through the air pressure gauge assembly 10 itself. By being positioned in a right angle with the valve stem opening 17 the air intake through the air exhaust check valve 20 is separated from the airtight chamber 16 housing the sensing element 12, and therefore does not interfere with the function of the sensing element 12. Furthermore, the right-angled air intake prevents the air pressure gauge assembly 10 from extending the valve stem of an inflatable tire too far solving a problem of prior art air pressure gauges.

Referring now to FIG. 5, a cross sectional view of an air pressure gauge assembly 50 having a straight air intake according to the present invention is shown. The air pressure gauge assembly 50 generally comprises a gauge body 11, a sensing element 12, a pressure indicator 13, a dial face 40, a lens cover 15, and an air exhaust check valve 20. An opening 17 is provided for receiving a typical valve stem of an inflatable tire. The air pressure gauge assembly 50 can be mounted, preferably screwed on, to the typical valve stem and can be locked in this position using e.g. a locking screw. The connection is sealed with a washer 18, preferably an o-ring.

The sensing element 12 as shown comprises a Bourdon tube 19, as discussed in FIG. 1. The sensing element 12 can further comprise a helix coil, a diaphragm (as shown in FIG. 2), or a c-tube, similar to "Power Flex™ Movement" manufactured by ASHCROFT®.

The gauge body 11 of the air pressure gauge assembly 50 as shown in FIG. 5 has a unique compact design with the air intake being positioned straight across the opening 17 for receiving the valve stem and the dial face 40 being positioned in a right angle. By being positioned straight across the valve stem opening 17 the air intake through the air exhaust check valve 50 is separated from the airtight chamber 16 housing the sensing element 12, and therefore does not interfere with the function of the sensing element 12. Furthermore, the right-angled dial face 40 might be easier to read in some applications and prevents the air pressure gauge assembly 50 from extending the valve stem of an inflatable tire too far thereby solving a problem of prior art air pressure gauges. The air pressure gauge assembly 50 can further include all features discussed with the air pressure gauge assemblies 10 and 30.

Still referring to FIG. 5, the lens cover 15 comprises a magnifying lens generally mounted over the edge of the gauge body 11 in a sealed connection or manufactured through injection mould. The pointer 47 is bent upwards to allow viewing from the side as well as from top. Indicia and a dial scale are engraved in the magnifying lens.

In one embodiment, a warning light 43 is installed within the dial face 40, as shown in FIGS. 4 and 5. The warning light 43 is powered by an external power source 44, preferably a cadmium battery. The warning light 43 indicates a lower than normal air pressure and can be adjusted to be activated if the tire air pressure decreases by a certain amount, for instance 2 psi or 4 psi. The warning light 43 can get a signal from a sensor or a pressure switch, where an electrical circuit is opened or closed in response to a predetermined hydraulic pressure entering the switch from a connected source, preferably the sensing element 12. The warning light 43, preferably a LCD/LED, can be steady or flashing. Further, shown in FIGS. 4 and 5, a display light 45 powered by the external power source 44 can be integrated to enhance the readability of the dial face 40. The display light 45 is also connected to an on/off switch 46, in order to be turned on only if needed. If necessary, more than one display light 45 can be installed. The display light 45 can also be an INDIGLO nightlight installed beneath the dial face 40 or the dial face 40 can be luminescent.

Figure 7:
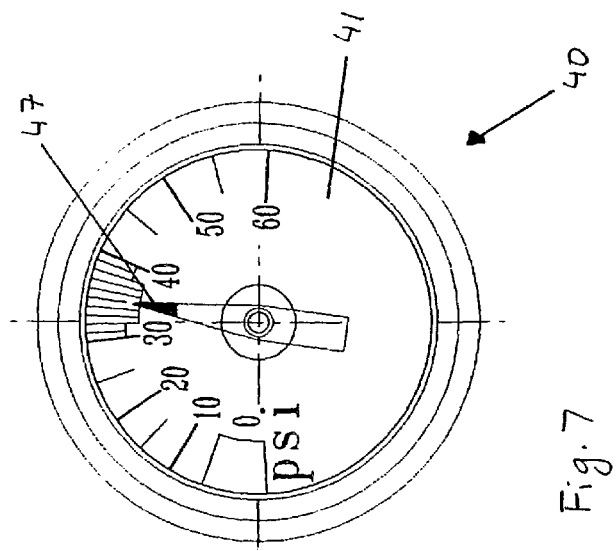
FIG. 7 is a top view of an analog dial face of the air pressure gauge assembly of FIG. 6 according to the present invention.
Figure 6:
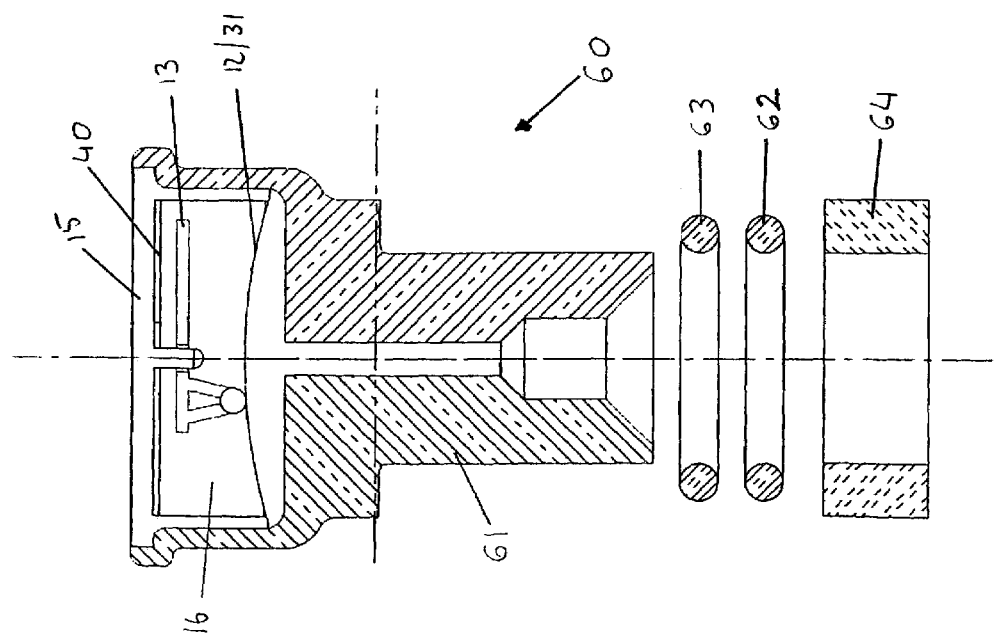
FIG. 6 is a cross sectional view of an air pressure gauge assembly mountable through the wheel rim according to the present invention.

Turning now to FIG. 6, a cross sectional view of an air pressure gauge assembly 60 mountable through the wheel rim according to the present invention is shown. The air pressure gauge assembly 60 generally comprises a gauge body 61, a sensing element 12, a pressure indicator 13, and a dial face 40. The gauge body 61 is mounted in an airtight connection through a aperture in the wheel rim, similar as a typical valve stem, using an outer rim air seal 62, an inner rim air seal 63, and a rim-fastening nut 64. The gauge body 61 can also be mounted using a threaded fitting through the wheel rim into a gauge-securing threaded aperture. The outer rim air seal 62 and the inner rim air seal 63 are washers, preferably o-rings. In one embodiment, the sensing element 12 is a diaphragm 31, as discussed with FIG. 2. The sensing element 12 can further comprise a helix coil, a Bourdon tube (as shown in FIG. 1), or a c-tube, similar to "Power Flex™ Movement" manufactured by ASHCROFT®. The dial face 40 can have an analog display 41, as shown in FIG. 7, or a digital display 42, as shown in FIG. 4. The gauge body 61 can be designed so that the dial face 40 is in a straight line with the airflow coming from the tire, as shown in FIG. 6, or in an angled position. The dial face can include a display light 45 and a warning light 43, as descript in FIG. 5. The lens cover 15 is shown as a non-magnifying lens in FIG. 6, but could also be a magnifying lens, as shown in FIG. 5.

The gauge bodies 11 and 61 have a compact design, as not to extend the; valve stem of a tire or the wheel rim too far, but are not limited to any particular shape, material, or color.

The valve stem mountable air pressure gauge assemblies 10, 30, and 50 offer the convenience of being mounted to an existing tire valve stem and still allowing inflating or deflating of the tire there through while continuously displaying the air pressure. Several configurations of the gauge body 11 are discussed, including the air intake being positioned in a right angle with the valve stem and the straight air intake in connection with an right-angled dial face 40, providing that the air intake through the air exhaust check valve 20 is separated from the airtight chamber 16 housing the sensing element 12, and therefore does not interfere with the function of the sensing element 12. Therefore, the air pressure gauge assemblies 10, 30, and 50 overcome problems connected with prior art air pressure gauges.

By introducing the air pressure gauge assembly 60, mountable through the wheel rim of an inflatable tire, the continuous monitoring of the air pressure of inflated tires is made possible without interfering with the operation of the tire valve stem and replacement of the tire. A diaphragm 31 of simple mechanical design is provided as sensing element 12. Therefore, the air pressure gauge assembly 60 has a relatively high reliability and requires little or no maintenance.

Both types of air pressure gauge assemblies provide the tire to be sealed in case the gauge body 11 or 61 is accidentally broken off or fractured. Furthermore, both types of air pressure gauge assemblies 10 and 60 provide several variations of easy to read dial faces 40, that may include a warning light for lower than normal air pressure and a display light.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A compact air pressure gauge assembly mountable to a valve stem of a inflatable tire comprising, in combination:
   a gauge body having an opening for receiving a standard valve stem;
   a sensing element being disposed in an airtight chamber inside said gauge body;
   a pressure indicator being connected to said sensing element;
   an air exhaust check valve;
   a dial face;
   a lens cover;
   wherein said air exhaust check valve is positioned in a right angle with said opening for receiving a standard valve stem; and
   wherein said air exhaust check valve further comprises a plunger, an air exhaust compressing spring, a check-valve washer, and an air intake manifold cover.

2. The compact air pressure gauge assembly of claim 1, wherein said air exhaust check valve is positioned straight across said opening for receiving a standard valve stem and said dial face is positioned in a right angle.

3. The compact air pressure gauge assembly of claim 1, wherein said air intake manifold cover is threaded on the outside to accept a standard valve stem cap.

4. The compact air pressure gauge assembly of claim 1, wherein said sensing element is selected from the group consisting of a Bourdon tube, a helix-coil, a c-tube, or a diaphragm.

5. The compact air pressure gauge assembly of claim 4, wherein said diaphragm further comprises a membrane being in a geared connection with said pressure indicator.

6. The compact air pressure gauge assembly of claim 4, wherein said diaphragm further comprises a membrane being in a non-geared connection with said pressure indicator.

7. The compact air pressure gauge assembly of claim 1, wherein said airtight chamber is non-liquid filled.

8. The compact air pressure gauge assembly of claim 1, wherein said airtight chamber is liquid filled.

9. The compact air pressure gauge assembly of claim 1, wherein said dial face comprises an analog display having indicia and dial scale thereon.

10. The compact air pressure gauge assembly of claim 1, wherein said dial face comprises a digital display.

11. The compact air pressure gauge assembly of claim 9 or 10, wherein said dial face further comprises a warning light.

12. The compact air pressure gauge assembly of claim 11, wherein said warning light is a steady light.

13. The compact air pressure gauge assembly of claim 11, wherein said warning light is a flashing light.

14. The compact air pressure gauge assembly of claim 11, wherein said warning light is a LCD/LED.

15. The compact air pressure gauge assembly of claim 9 or 10, wherein said dial face further comprises a display light.

16. The compact air pressure gauge assembly of claim 15, wherein said display light comprises an INDIGLO nightlight.

17. The compact air pressure gauge assembly of claim 15, wherein said display light comprises a LCD/LED.

18. The compact air pressure gauge assembly of claim 1, further comprising an external power source and an on/off switch.

19. The compact air pressure gauge assembly of claim 1, wherein said lens cover comprises a non-magnifying lens.

20. The compact air pressure gauge assembly of claim 1, wherein said lens cover comprises a magnifying lens.

21. A compact air pressure gauge assembly mountable through the wheel rim of a inflatable tire comprising, in combination:
    a gauge body;
    a sensing element being disposed in an airtight chamber inside said gauge body;
    a pressure indicator being connected to said sensing element;
    an air exhaust check valve formed integrally with said gauge body;
    a dial face;
    a lens cover;
    wherein said air exhaust check valve is positioned in a right angle with said opening for receiving a standard valve stem; and
    wherein said air exhaust check valve further comprises a plunger, an air exhaust compressing spring, a check-valve washer, and an air intake manifold cover.

22. The compact air pressure gauge assembly of claim 21, wherein said sensing element comprises a diaphragm.

23. The compact air pressure gauge assembly of claim 22, wherein said diaphragm further comprises a membrane being in a geared connection with said pressure indicator.

24. The compact air pressure gauge assembly of claim 22, wherein said diaphragm further comprises a membrane being in a non-geared connection with said pressure indicator.

25. The compact air pressure gauge assembly of claim 21, wherein said airtight chamber is non-liquid filled.

26. The compact air pressure gauge assembly of claim 21, wherein said airtight chamber is liquid filled.

27. The compact air pressure gauge assembly of claim 21, wherein said dial face comprises an analog display having indicia and dial scale thereon.

28. The compact air pressure gauge assembly of claim 21, wherein said dial face comprises a digital display.

29. The compact air pressure gauge assembly of claim 27 or 28, wherein said dial face further comprises a warning light.

30. The compact air pressure gauge assembly of claim 29, wherein said warning light is a steady light.

31. The compact air pressure gauge assembly of claim 29, wherein said warning light is a flashing light.

32. The compact air pressure gauge assembly of claim 29, wherein said warning light is a LCD/LED.

33. The compact air pressure gauge assembly of claim 27 or 29, wherein said dial face further comprises a display light.

34. The compact air pressure gauge assembly of claim 33, wherein said display light comprises an INDIGLO nightlight.

35. The compact air pressure gauge assembly of claim 33, wherein said display light comprises a LCD/LED.

36. The compact air pressure gauge assembly of claim 21, further comprising an external power source and an on/off switch.

37. The compact air pressure gauge assembly of claim 21, wherein said lens cover comprises a non-magnifying lens.

38. The compact air pressure gauge assembly of claim 21, wherein said lens cover comprises a magnifying lens.

39. A compact air pressure gauge assembly mountable to a valve stem of an inflatable tire comprising, in combination:
    a gauge body having an opening for receiving a standard valve stem;
    a sensing element being disposed in an airtight chamber inside said gauge body;
    a pressure indicator being connected to said sensing element;
    an air exhaust check valve formed integrally with said gauge body;
    wherein said air exhaust check valve is positioned in a right angle with said opening for receiving a standard valve stem; and
    wherein said air exhaust check valve further comprises a plunger, an air exhaust compressing spring, a check-valve washer, and an air intake manifold cover.

40. The compact air pressure gauge assembly of claim 39, wherein said air exhaust check valve is positioned in a right angle with said opening for receiving a standard valve stem.

* * * * *